US012276643B2

(12) United States Patent
Cabral Vazquez

(10) Patent No.: US 12,276,643 B2
(45) Date of Patent: Apr. 15, 2025

(54) AUTOMATED PURGE SYSTEM BY GAS INJECTION

(71) Applicant: PETRÓLEO BRASILEIRO S.A.—PETROBRAS, Rio de Janeiro (BR)

(72) Inventor: Joselito Cabral Vazquez, Rio de Janeiro (BR)

(73) Assignee: PETRÓLEO BRASILEIRO S.A.—PETROBRAS, Rio de Janeiro (BR)

(*) Notice: Subject to any disclaimer, the term of this patent is extended or adjusted under 35 U.S.C. 154(b) by 406 days.

(21) Appl. No.: 17/749,588

(22) Filed: May 20, 2022

(65) Prior Publication Data
US 2022/0373519 A1 Nov. 24, 2022

(30) Foreign Application Priority Data

May 21, 2021 (BR) .................. 10 2021 009950 0

(51) Int. Cl.
G01N 30/24 (2006.01)
G01N 1/34 (2006.01)
(Continued)

(52) U.S. Cl.
CPC ......... *G01N 30/24* (2013.01); *G01N 35/1079* (2013.01); *G01N 1/34* (2013.01);
(Continued)

(58) Field of Classification Search
CPC ........ G01N 30/24; G01N 30/18; G01N 30/30; G01N 30/72; G01N 30/02; G01N 35/1079;
(Continued)

(56) References Cited

U.S. PATENT DOCUMENTS 4,003,713 A * 1/1977 Bowser ............... B01D 1/00
422/562
5,660,792 A * 8/1997 Koike ............... G01N 35/10
436/178

(Continued)

FOREIGN PATENT DOCUMENTS

CN 204255743 U 4/2015
CN 205749089 U 11/2016

OTHER PUBLICATIONS

Thermo Electron Corporation, "Finnigan Gas Bench II" Operating Manual, Sep. 28, 2004. <https://isolab.ess.washington.edu/resources/manuals/GasBench.pdf> (Year: 2004).*

*Primary Examiner* — Jonathan M Dunlap
(74) *Attorney, Agent, or Firm* — Sughrue Mion, PLLC

(57) ABSTRACT

The present invention addresses to an automated gas injection system in vials with rubber septa, for simultaneous injection of gas in 24 or more positions, with injection pressure control and/or overpressure detection, applied to mass spectrometry analyses and/or gas chromatography. The present invention can be used, for example, in isotopic analyses of geological materials in equipment with carbonate extraction units, in the cleaning and decontamination of tubes to be used in isotopic or chromatographic analyses, and in the removal of contaminants from steam drag or by continuous flow, or coming from the free space of vials or tubes in the analyses of organic and inorganic materials.

The application of this invention allows reducing the current times of routine purge (flush) of at very least 3 minutes for every 2 positions (72 positions in total and final time of 108 minutes, in a batch of samples) to a total of 96 positions in 3 minutes, with a reduction of 12 times or more in the flush time, which implies greater analytical capacity to the laboratory, lower external costs of sending samples, less time to obtain results, with technology that is easy to implement in (Continued)

universities and research centers in general, in addition to increasing the lifespan of rubber septa.

12 Claims, 3 Drawing Sheets

(51) Int. Cl.
*G01N 30/02* (2006.01)
*G01N 30/18* (2006.01)
*G01N 30/30* (2006.01)
*G01N 30/72* (2006.01)
*G01N 35/00* (2006.01)
*G01N 35/10* (2006.01)

(52) U.S. Cl.
CPC ............ *G01N 30/02* (2013.01); *G01N 30/18* (2013.01); *G01N 30/30* (2013.01); *G01N 30/72* (2013.01); *G01N 2035/00346* (2013.01); *G01N 35/1074* (2013.01)

(58) Field of Classification Search
CPC ......... G01N 35/1074; G01N 35/00594; G01N 2035/00346; G01N 2035/00376; G01N 1/34
See application file for complete search history.

(56) References Cited

U.S. PATENT DOCUMENTS

| | | | |
|---|---|---|---|
| 5,948,360 A * | 9/1999 | Rao | G01N 30/24 422/65 |
| 6,793,891 B2 * | 9/2004 | Yiu | G01N 35/1074 73/864.11 |
| 9,476,895 B2 | 10/2016 | Self et al. | |
| 2014/0116159 A1 * | 5/2014 | Zimmerman | G01N 30/16 73/863.01 |
| 2022/0065885 A1 * | 3/2022 | Kroog | G01N 35/10 |

* cited by examiner

AUTOMATED PURGE SYSTEM BY GAS INJECTION

FIELD OF INVENTION

The present invention addresses to an automated gas injection system, aiming at a simultaneous gas injection in 24 or more positions, with flow rate measurements of injected flow, injection pressure control or overpressure detection, for purging of vials closed with septa, applied to analyses by mass spectrometry and/or gas chromatography.

DESCRIPTION OF THE STATE OF THE ART

The analysis of the isotopic ratio of carbon and oxygen in samples of rocks of carbonate origin depends on the passage of helium in glass tubes insulated from the external air through rubber septa. The elimination of external air is essential for analytical quality assurance and is an essential step in the isotope ratio measurement process.

The automatic helium gas flow cleaning system from Thermo Fischer company, a commercial and technical reference in scientific circles, uses a robotic system for perforating rubber septa and injecting gas for oxygen displacement and drying at 70° C. from rubber vials as a preparation for carbon and oxygen isotope ratio analyses. However, the system is limited to performing the displacement of atmospheric air from the tubes to two samples at a time, due to equipment limitations, and the gas injection time for air elimination is controlled by the operator. Air elimination occurs in two tubes at a time, for a period of around 2 to 3 minutes of helium stream, with adjustable flow rate. The tubes are placed in aluminum blocks with heating and temperature control. Details of the Thermo Fischer system can be seen in FIGS. 1 and 2.

In the current system for preparing carbonate samples, model Gas Bench, from Thermo Fisher company, there is a tray consisting of a block containing 96 positions, with about 24 positions not used in the subsequent step of analysis; that is, 72 useful positions, approximately. For each batch effectively consisting of 72 positions, the system takes 3 minutes for gas injection and switching to the next two tubes. The Thermo Fischer system is limited to performing the displacement of atmospheric air from the tubes to two samples at a time, due to equipment limitations. Considering 72 positions for every two tubes, this corresponds to 36 times the system changes its position, taking 3 minutes of gas injection, 36 times in total with 3 minutes of gas injection, for a batch of 72 tubes; that is, 108 minutes in total.

The embodiment of the present invention involves an automated gas injection system in vials with septum, for the simultaneous injection of gas in 24 or more positions, with injection pressure control or overpressure detection, applied to preparation equipment for analyses by mass spectrometry and/or gas chromatography.

The system of the invention allows the reduction of current cleaning routine times in a batch of samples by gas injection of 3 minutes for every 2 positions, 72 positions in total and final time of 108 minutes, for a total of 80 positions in 3 minutes; in other words, a 36 times reduction in cleaning time by gas injection, considering the same number of useful positions in the Thermo Fisher system.

In some laboratories, to speed up the displacement of air with helium stream, this is done manually, through individual needles of inlet and outlet of the gas in each tube for exhaust, at room temperature, as shown in FIG. 3. Particularly, in one application, a system was used that can manually perforate up to fourteen tubes simultaneously, but without automation, which corresponds at most to a performance increase from 2 to 14 samples, or 7 times better than the Thermo Fischer equipment.

It is also observed that there are systems with needles used as sample concentrators, as shown in FIG. 4, with several positions, around 24 positions, operating manually or semi-automatically, with application in partial drying of samples with gas flow and solvent evaporation. In this case, the tubes are open and there is no perforation of rubber septa, not having the objective of removing atmospheric air. Therefore, in these systems there are no septa for isolation from the external air, or pressure controls in the tubes, and the inlet and outlet of gases takes place in the tubes without hindrance.

Document CN205749089U discloses a nitrogen evaporator, which includes a gas distribution system, a sample positioning structure, and a heating device in order to substantially increase the work performance, reducing the time required for the sample concentration. A sample tube is placed on the sample positioning structure, and the heating device is installed on the sample positioning structure to heat the sample tube. The gas distribution system is installed above the sample positioning structure, and includes a gas circuit control system, a needle plate, a needle holder and a nitrogen blowing needle.

U.S. Pat. No. 9,476,895B2 discloses an automated sample processing system, which has a sample inlet adapted to simultaneously receive eight sample containers, a reagent inlet adapted to receive one or more new reagents, a consumables inlet adapted to receive one or more new reagents, a solid residue outlet adapted to receive used consumables, a liquid residue outlet adapted to receive one or more used reagents, and a processing center.

Document CN204255743U discloses a nitrogen gas injection equipment, comprising a pedestal, a support structure and a guide tube back plate. The support structure is fixed vertically to the rear part of the base, the guide tube is slid into the support and further comprises an air inlet connecting tube, a gas flow controller, a branch guide tube, and a gas device.

No prior art document discloses an automated gas injection system in septum vials, such as that of the present invention.

BRIEF DESCRIPTION OF THE INVENTION

The present invention addresses to an automated gas injection system in vials with septum, for the simultaneous injection of gas in 24 or more positions, with injection pressure control or overpressure detection, applied to analyses by mass spectrometry and/or gas chromatography.

The present invention can be applied, for example, in isotopic analyses of geological materials in equipment with carbonate extraction units, in the cleaning and decontamination of tubes to be used in isotopic or chromatographic analyses, and in the removal of contaminants from steam drag or by continuous flow, or coming from the free space of vials or tubes, in the analyses of organic and inorganic materials.

BRIEF DESCRIPTION OF DRAWINGS

The present invention will be described in more detail below, with reference to the attached figures which, in a schematic form and not limiting the inventive scope, represent examples of its embodiment. In the drawings, there are.

DETAILED DESCRIPTION OF THE INVENTION

Figure 1:
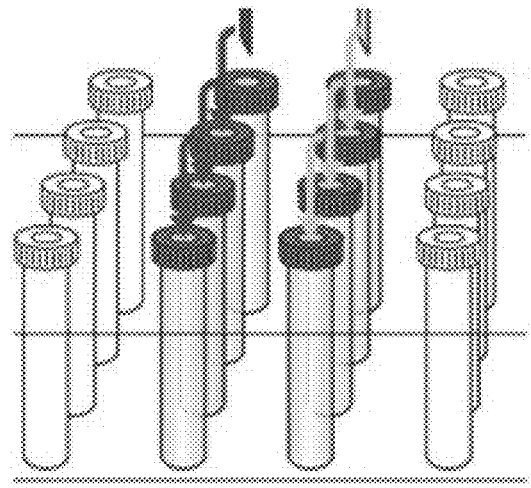
FIG. 1 illustrating Thermo Fischer commercial two-position automated system for gas injection with two simultaneous needles.
Figure 2:
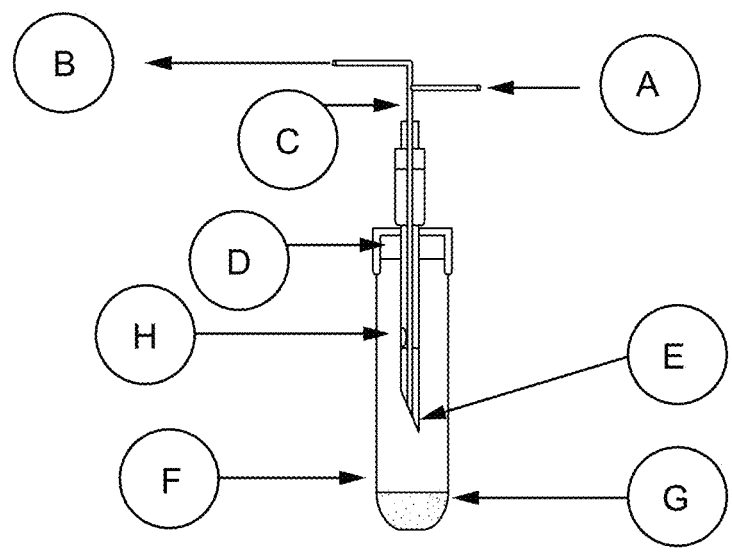
FIG. 2 illustrating the Thermo Fischer purge system. This describes a method of transferring $CO_2$ using helium as a cleaning drag gas through a Thermo Fisher twin needle, showing the inlet and outlet of gas in the flush process. There are shown: a helium gas stream (A), helium gas and helium+ air streams (B), a transfer needle (C), a rubber septum (D), a drag gas (helium) outlet to the sample tube (E), a sample tube (F), a sample (G), and an outlet hole (H) of contaminants by (B).
Figure 3:
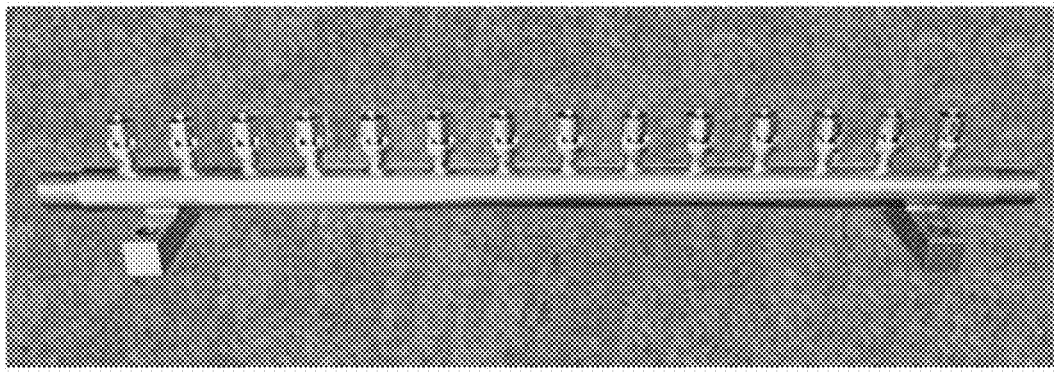
FIG. 3 illustrating the manual manifold-type system for placing needles for injecting drag gas into tubes, used in some laboratories.
Figure 4:
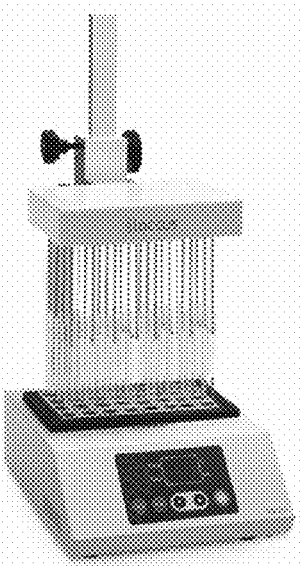
FIG. 4 illustrating the commercial evaporation or drying system, or sample concentrator by gas injection, with manual elevator system.
Figure 5:
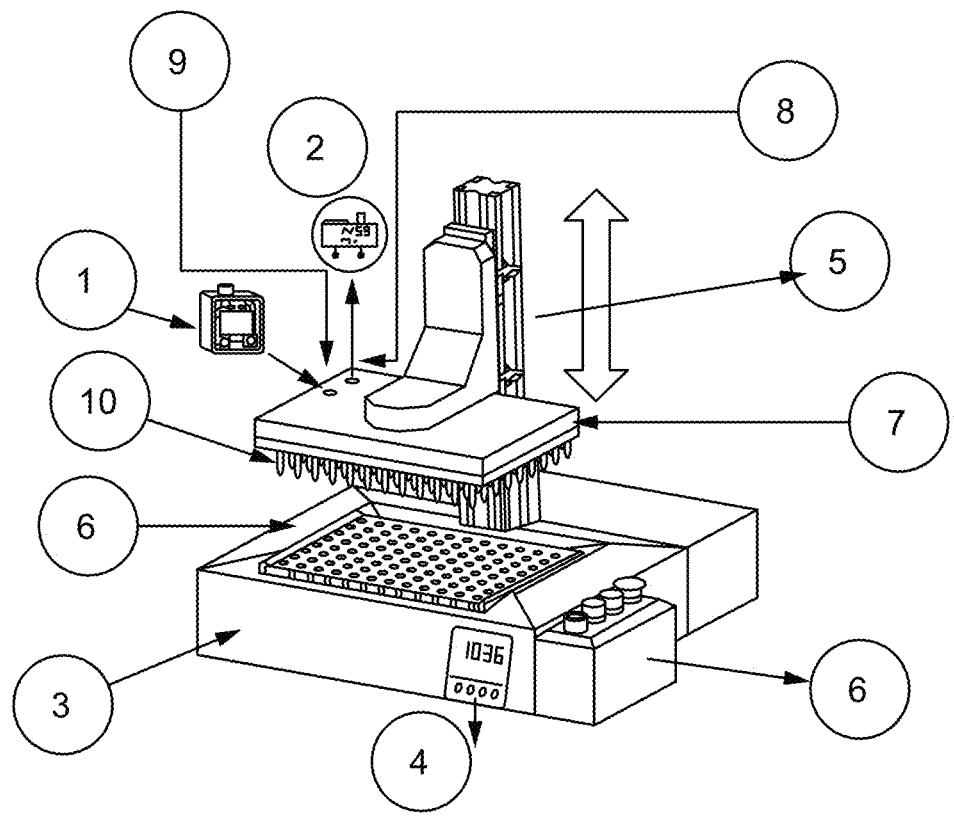
FIG. 5 illustrating a schematic drawing of the automated gas injection system in vials with septum, object of the present invention. There are represented: a flow meter (1) for injection gas, a pressure meter (2) for outlet gases, a digester block (3) for test tubes, a temperature meter or controller (4), a tower or platform elevator (5), a lift control actuator button (6), a needle support platform (7), a gas outlet hole (8), a drag gas injection hole (9), and a gas inlet needle (10)).

The automated gas injection system that is object of this invention and illustrated in FIG. 5 comprises a block containing needles (10), fixed on a platform (7), for the simultaneous perforation of, but not limited to, 24, 25, 36, 48, 50, 72, 80, or 96 positions, in septa of butyl rubber or similar, with a lift control actuator button (6) to lift and control the height and the point of perforation of the septa, by means of a tower or elevator (5) of the platform (7), with overpressure control (2) of the outlet gases and of the flow rate (1) of injection of the drag gas.

Figure 6:
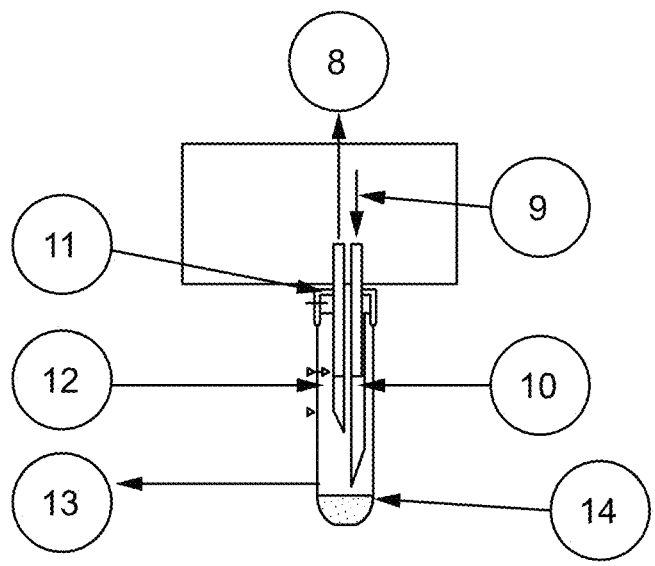
FIG. 6 illustrating a detail of the system of twin needles that pass through the rubber septum, in screw closures or crimp closures, allowing the use of standard needles with gauge 15 AWG to 28 AWG of stainless steel, common, easily available on the market, not requiring special cannulas. There are represented: streams of outlet gas and contaminant mixture (example: air, water vapor, etc.) (8), inlet gas stream (9), gas inlet needle (10), rubber septum (11), needle (12) where the drag gas (e.g., helium) exits from the sample tube (13), sample tube (13), and sample (14).

The inlet (9) and outlet (8) of the gases can occur through the same needle (10), or through distinct needles. A digester block (3) in ceramic, aluminum or stainless steel, with resistances for heating by the controller and thermocouple sensor (4) type Pt100, T, J, or K, which allows heating and maintaining the temperature of the set between 55 and 90° C., with an accuracy of 0.2° C. or better. Details of the system of this invention can be seen in FIG. 6, for the case of two distinct needles, where the drag gas exits the sample tube (13) through the needle (12).

The simultaneous perforation reduces the time of the gas injection cleaning operation, with a simultaneous perforation of 24, 25, 36, 48, 50, 72, 80, 96 vials with septum and caps, or precisely of septa of these vials with septum and caps.

The system of the invention is not a concentrator, but can function as one. It works by dragging gases indicated by the operator before the start of the process, or by means of a manual selection box, or by automatic switching.

The system of this invention allows the reduction of the current total cleaning routine times in a batch of samples by gas injection of 3 minutes for every 2 positions, 72 positions in total and final time of 108 minutes, for a total of 72 positions in 3 minutes; that is, a 36 times reduction in cleaning time by gas injection, considering the same number of positions. This allows a reduction of almost two hours in cleaning time by gas injection, allowing the analysis of 5 to 6 batches per week, instead of just 3, as is normally practiced.

A system that perforates and injects gas simultaneously in 72 positions, like the one of this invention, not only allows reducing the total time of all injection positions to 3 minutes; that is 108/3=36 times faster than the conventional system, but also it does not add the time of moving the robotic arm from the equipment to the new position to the initial time of 108 minutes. In addition, if a longer purge time is required, going from 3 minutes to 10 minutes, the impact on the result of the times would be even greater (72*10/2=360 minutes), but still 36 times faster than the conventional system (360/10=36). Currently, with a total cleaning time of 108 minutes by helium injection, which takes place within administrative hours, it will allow a reduction between analysis runs of almost 2 hours, considering the cleaning time by gas injection.

A weekly calculation (5 days) indicates a loss of 10 hours with the cleaning procedure; that is, more than hours of the administrative regime. For each batch of analyses, 18 hours of analysis are effectively spent after the cleaning procedure (72 positions or samples at a time). These analysis hours cannot yet be reduced due to instrumental and software limitations, as there are no two analysis channels. On average, the time spent for each batch between preparation steps and analysis is between 2 and 4 hours. In case of system adjustments, this prevents more than 3 weekly batches, as the tubes must be freshly cleaned before the start of the analysis.

With the reduction of cleaning (purge) time by gas injection to 3 minutes, by using the present invention, it is possible to add two more weekly batches of 72 (1 hour and 48 minutes) or 80 samples (120 minutes), which can increase productivity by approximately 72 positions×2 additional batches×4 weeks in samples per month (576 to 648 samples/month).

It should be emphasized that additional samples can be fed to the reaction and analysis system of the invention, but depend on the elimination of air in the new sample tubes. However, when the analysis equipment enters "reaction and data acquisition" mode, it is not possible to inject gas to clean the new tubes added.

The example cited above was used in order to illustrate some particular embodiments of the present invention, and should not, however, be interpreted as limiting the same.

The system of the invention allows the quick cleaning of several tubes, increasing the productivity of the analysis system in administrative hours and allowing a faster routine of preparation for analysis, having a direct impact on the number of samples to be analyzed per block and per day, resulting in a reduction in the number of samples to be sent to external laboratories. This represents a better use of the hour/machine time, a reduction of external shipping costs, a reduction of expenses with contracts and expenses with external analysis, less time to obtain results, faster customer service. The application of the present invention leads to greater analytical capacity in the laboratory, with the use of a technology that is easy to implement in research centers in general.

The reduction of current routine purge (flush) times allows the analysis of more weekly batches, in addition to the reduction of analytical costs with shorter shutdowns between analyses, local flush in the preparation equipment itself for analyses, or externally, in a separate module.

Furthermore, the invention allows the injection and dragging in vials with septum and caps, closed, with control of the pressure and flow of the injected gas, without risks for the operators, with direct displacement to a gas outlet, or to the exhaust, without opening the system. This is an advantage if there is the presence of toxic gases, such as $H_2S$, inside the vials, generated during sample preservation and after collection. These generated gases are not of interest to analysis and could also be displaced by inert gas injection prior to analysis.

The application of the invention also allows reducing the disposal of rubber septa, which would be constantly perforated in the same position by the conventional flush system. With the invention, the perforations in points in positions adjusted by the user, but random, results in the increase of the useful life of the rubber septa.

It should be noted that, although the present invention has been described in relation to the attached drawings, it may undergo modifications and adaptations for configuration adjustments, depending on the specific situation, but provided that it is within the inventive scope defined herein.

The invention claimed is:

1. An automated purge system comprising:
 a platform comprising:
  a drag gas injection point;
  a gas outlet point;
  needles configured to simultaneously perforate a septa;
  a flow rate meter; and
  a pressure meter;
 an adjustable arm elevator coupled to the platform;
 a lift control system that is configured to control the adjustable arm elevator such that the needles of the platform simultaneously perforate the septa; and
 a heating block comprising a temperature meter or a temperature controller.

2. The automated purge system according to claim 1, wherein the needles are configured to simultaneously perforate 24, 25, 36, 48, 50, 72, 80, or 96 positions.

3. The automated purge system according to claim 1, wherein a same needle from among the needles is configured to inject a gas, and receive and output the gas after injecting the gas.

4. The automated purge system according to claim 3, wherein all gas injection and outlet lines of the automated purge system are independent from one another.

5. The automated purge system according to claim 1, wherein the lift control system is further configured to control the needles to perforate the septa by changing a height of the platform by controlling the adjustable arm elevator.

6. The automated purge system according to claim 1, wherein the flow rate meter is configured to detect a flow rate of injection gas injected through the drag gas injection point, and
 the pressure meter is configured to detect overpressure of output gas that is output by the gas outlet point.

7. The automated purge system according to claim 1, wherein the heating block is a ceramic, aluminum, or stainless steel digest block, and
 the heating block is configured to sense a temperature and perform heating based on the temperature that is sensed.

8. The automated purge system according to claim 7, wherein the heating block comprises the temperature meter, and the temperature meter is a Pt100, T, J, or K type temperature sensor.

9. The automated purge system according to claim 1, wherein the heating block is configured to maintain a temperature between 55° C. and 90° C.

10. The automated purge system according to claim 1, wherein the automated purge system is configured to have a gas injecting cleaning operation time of equal to less than 3 minutes, in a total of 72 or more positions.

11. The automated purge system according to claim 1, wherein the automated purge system is configured to be applied in:
 isotopic analyses of geological materials in equipment with carbonate extraction units;
 cleaning and decontamination of tubes to be used in isotopic or chromatographic analyses; or
 removal of contaminants from steam dragging or by continuous flow, or from a free space of vials or tubes, in analyses of organic and inorganic materials.

12. The automated purge system according to claim 1, wherein a first needle among the needles is configured to inject a gas, and a second needle from among the needles is configured receive and output the gas injected by the first needle.

* * * * *